United States Patent Office 3,432,395
Patented Mar. 11, 1969

3,432,395
SALICYLATE METHOD FOR THE QUANTITATIVE DETERMINATION OF AMMONIA NITROGEN
John Reardon, Reseda, Calif., assignor to Uni-Tech Chemical Manufacturing Company, Sun Valley, Calif., a corporation of California
No Drawing. Filed June 8, 1966, Ser. No. 555,985
U.S. Cl. 195—103.5           20 Claims
Int. Cl. C12k 1/00; C09k 3/00

ABSTRACT OF THE DISCLOSURE

A color changing composition for the colorimetric quantitative determination of nitrogen in biological fluids including an enzyme which reacts with the nitrogen in the fluid to liberate ammonia, an alkali metal salt of salicylic acid mixed with a salt of nitroprussic acid, and a chlorine donor which yields hypochlorite in alkaline solution. The liberated ammonia reacts with the salicylate and hypochlorite produced in the presence of nitroprusside to form an emerald green chromatic substance, the intensity of which can be measured colorimetrically.

---

This invention relates to the analytical determination of ammonia nitrogen in fluids. More specifically, this invention relates to a composition for the analytical determination of urea in terms of ammonia nitrogen in biological fluids and to a method for the analysis of urea nitrogen in such fluids.

The analytical determination of urea nitrogen in biological fluids such as serum, urine and blood may be accomplished by any one of several established methods. A frequently used enzymatic procedure utilizes the reaction between the enzyme urease with urea in a buffered solution to hydrolyze the urea to ammonium carbonate. Ammonia is then liberated from the ammonium carbonate by the addition of sodium borate. The liberated ammonia is collected in a dilute hydrochloric acid solution. Upon the addition to this solution of alkaline potassium mercuric iodide (synonym Nessler's reagent) color developing reagents a color is developed in the solution the intensity of which is proportional to the amount of nitrogen available in the solution. The intensity of this color may be measured by colorimetric techniques. This procedure is described in detail in the manual of Clinical Laboratory Methods. Fourth Edition by Opal Hepler, publisher, Charles C. Thomas, Springfield, Ill.

Another method (non enzymatic) for the analytical determination of urea nitrogen in biological fluids utilizes a condensation reaction wherein diacetylmonozime is reacted with urea in acid solution. The reaction is carried out with a filtrate of the biological fluid to be analyzed. Upon completion of the reaction, a yellow color is produced which is proportional in intensity to the amount of urea nitrogen present in solution.

A more recently developed method is that of Fawcett and Scott. This method involves the reaction of ammonia which has been enzymatically liberated from urea with sodium phenate and hypochlorite in the presence of sodium nitroprusside to form a chromatic substance which has an optical absorption which can be measured colorimetrically.

A further refinement of the Fawcett and Scott procedure was made by Chaney and is described in U.S. Patent No. 3,119,751. To reduce the number of reagents used, to overcome the extreme sensitivity of nitroprusside to atmospheric water vapor and to overcome the instability of sodium phenate solutions, Chaney devised a method whereby a hot melt or phenol and nitroprusside was encapsulated in the phenol and was thereby protected from atmospheric moisture. Chaney's method also provides for the use of phenol as a reagent with subsequent conversion to sodium phenate in alkaline solution. This is in contradistinction to previous methods which employed sodium phenate as the reagent. Despite these refinements, however, the phenol-nitroprusside color reagent, when in aqueous solution is stable for extended periods of time only when refrigerated at from 2° to 10° C.

The prior art methods for the determination of urea nitrogen in biological fluids have several limitations upon their usefulness as analytical tools. The earlier methods discussed are dependent on reagent concentrations, the sample sizes used must be relatively large (except in the phenatehypochlorite reaction) and the color reagents are unstable in alkaline solution with the result that the precision of these tests is low. In addition, the earlier methods require the rapid addition of reagents in their proper order otherwise the developed color fades and erroneous results are achieved. Furthermore the development of turbidity in the solutions of some of the prior art procedures is detrimental to optical readings. Some of the prior art methods are cumbersome in that they require the preparation and storage or a relatively large number of separate reagents.

In its broadest aspect the invention is a color changing composition for the colorimetric determination of nitrogen in fluids comprising an enzyme which reacts with the nitrogen in the fluid to liberate ammonia, an alkali metal salt of salicylic acid mixed with a salt of nitroprussic acid and a chlorine donor which yields hypochlorite in alkaline solution. The liberated ammonia reacts with sodium salicylate and hypochlorite in the presence of nitroprusside to form an emerald green chromatic substance, the intensity of which can be measured colorimetrically.

In the practice of one of its aspects, this invention relates to the analytical determination of urea nitrogen in biological fluids such as whole blood plasma or urine. The analytical determination is accomplished by first adding a buffered urease solution to the fluid sample to be analyzed. The enzyme urease specifically hydrolyzes urea in solution to ammonia and carbon dioxide. To the solution are then added an alkali metal salicylate, sodium nitroprusside, and dichloro-S-triazine trione (synonym, dichloroisocyanurate). These materials in the presence of ammonia in alkaline solution develop a green color the intensity of which is measured colorimetrically.

In one of its aspects this invention has the advantage of providing an improved method for the analytical determination of urea nitrogen in biological fluids which is rapid and precise and which requires a minimum number of separate reagent solutions.

The invention is also advantageous in that the color developing reagents and the manner of their use provide solutions that are stable for extended periods of time without refrigeration.

A further advantage embodied in this invention is that the rate of reaction and hence of color formation is such that multiple specimens can be processed without fading of developed color.

Still another significant advantage of this invention is that the reagents are of a low order of toxicity and are non-corrosive and can, therefore, be handled easily and safely.

Yet another advantage of the invented composition is that dichloro-S-triazine trione is not a light sensitive compound, therefore, solutions of this material have excellent storage stability and can be easily dispensed with automated equipment.

Other advantages will become apparent upon the following detailed description of the materials and procedures employed in the practice of the invention.

The materials comprising the color developing composition employed in the practice of this invention are an alkali metal salicylate, an alkali metal nitroprusside, and an alkaline solution of sodium or potassium dichloro-S-triazine trione which is the chlorine donor. The utilization of sodium salicylate in the color developing composition employed in the practice of the invention is a significant advance on the art. It is also possible to use various salts of salicyclic acid, however, the most convenient are the sodium, potassium, lithium and magnesium salts. Prior art procedures for the determination of urea nitrogen in biological fluids routinely employed in the color developing composition either sodium phenate or phenol which in alkaline solution produced sodium phenate; these solutions are relatively unstable and do not retain their efficacy for long. It has been found that sodium salicylate in the presence of nitroprusside and alkaline hypochlorite reacts with ammonia to produce a chromatic substance which has a relatively broad optical absorption band between wavelengths of 630–660 millimicrons. By the use of sodium salicylate in the composition the rate of color formation in the presence of ammonia is greatly reduced; but the reaction is rapid enough for technical applications on microgram quantities of ammonia in conjunction with a catalyst. This is attributed to the substituted molecular structure of sodium salicylate which is inherently less reactive than phenol which has a monohydric molecular structure. However, the mechanism by which the chromatic substance is formed or the exact nature of the chromatic substance is not yet clear. The reduction of the rate of color formation in analytical test solutions and particularly in tests of urea nitrogen in biological fluids is an important feature of the invented composition because it permits the simultaneous testing of large numbers of specimens. Because of the reduced rate of reaction, specimens to which the color developing reactants have been added do not achieve their ultimate color intensity so rapidly that specimens in the first tubes begin to fade in intensity before specimens in the last tubes have reached their ultimate intensity. It has recently been found that when sodium salicylate is used in the color changing composition that a chromatic substance is formed in the presence of alkaline hypochlorite even when no catalyst (sodium nitroprusside) is present in solution. Thus, it is possible to add only sodium salicylate and a hypochlorite donor to an ammonia nitrogen containing fluid to form a chromatic substance which can be measured colorimetrically. However, when no catalyst is used color formation is slower and its intensity less, thereby requiring larger sample sizes.

In addition, the utilization of sodium salicylate in the color developing composition of this invention has circumvented the limitation of prior art procedures of solution instability. Solutions of sodium salicylate are stable for extended periods of time without refrigeration. Furthermore, sodium salicylate is very convenient to use because it can readily be processed into tablets containing a predetermined amount of sodium salicylate. It has also recently been found that satisfactory results can be obtained in the method of this invention when phenyl benzoate in aqueous alcohol solution is used in place of salicylate. It is thought that a phenate is formed in alkaline solution and that the color forming reaction then proceeds as in the case of salicylate.

The role of sodium nitroprusside in the color reaction is as a catalyst; the rate and ultimate intensity for a given quantity of ammonia of color formation increasing as the amount of nitroprusside in the formulation is increased. It is within the scope of this invention to use as catalysts other salts of nitroprusside such as cupric nitroprusside, cobalt nitroprusside, nickel nitroprusside and zinc nitroprusside. The use of sodium nitroprusside is especially desirable in the practice of this invention since it is soluble in sodium salicylate and leaves no turbidity in salicylate solutions. The ratio by weight of sodium nitroprusside to sodium salicylate in the practice of this invention may range from as little as one part sodium nitroprusside to 500 parts sodium salicylate to as great as one part sodium nitroprusside to 20 parts sodium salicylate. For the purposes of this procedure optimum results are obtained when 60.0 milligrams of nitroprusside are mixed with 8.5 grams of sodium salicylate. A blend of predetermined amounts of sodium salicylate and sodium nitroprusside may be processed to convert the particulate materials into tablet form. This process serves to protect sodium nitroprusside from degradative attack of atmospheric water by physically excluding the water by reason of tightly packed particles of sodium salicylate. Supplying these materials in the form of tablets containing pre-weighed amounts of reagent will facilitate the rapid preparation of stock solutions of reagent by merely adding ammonia-free distilled water to the tablets.

In the preferred form of the invention, the alkaline solution of dichloro-S-triazine trione is prepared by dissolving the requisite amount of a salt of dichloro-S-triazine trione in an aqueous solution of sodium hydroxide; both the sodium and the potassium salt can conveniently be used. In alkaline solution the triazine dissociates to produce hypochlorite ions and is, therefore, functioning as the hypochlorite donor. In the color forming reaction, hypochlorite ions react with ammonia to form an intermediate which in the presence of sodium salicylate and sodium nitroprusside forms a chromatic substance. It should be noted that the requisite alkalinity provided by sodium hydroxide for the alkaline solution of dichloro-S-triazine trione may be obtained from other alkali metal salts such as potassium hydroxide or carbonate. However, sodium hydroxide is preferred in the present embodiment of the invention. When sodium hydroxide is employed the ratio by weight of sodium dichloro-S-triazine trione to sodium hydroxide can range from as little as 1:100 to as great as 1:1. As used in the procedure of the present invention, 0.25 gram of sodium dichloro-S-triazine trione are added to 100 milliliters of 0.30 molar sodium hydroxide.

As compared with prior art procedures it is advantageous to employ dichloro-S-triazine trione as the chlorine donor. Prior art procedures employ sodium hypochlorite in alkaline solution as the source of hypochlorite ion in the color developing reaction. Sodium hypochlorite has the disadvantage of being a noxious material which emits fumes during use. This characteristic is a limitation on the ease of handling and desirability of the reagent. Hypochlorite fumes may interfere with other tests being performed in the same laboratory. Dichloro-S-triazine trione, however, is a stable and non-noxious reagent; the solutions of this material are not light sensitive and, therefore, exhibit greater storage stability in solution than do solutions of sodium hypochlorite. It should be noted however that it is possible to use other reagents as the hypochlorite donor in the method of this invention. Satisfactory results are obtained with the alkali metal salts of hypochlorous acid in alkaline solutions.

The hydrolysis of urea with the accompanying production of ammonia is accomplished by the specific action of the enzyme urease. The color developing composition then reacts with ammonia to produce the chromatic substance which is to be measured. The hydrolysis of urea by a buffered solution of urease results in the formation of ammonia and carbon dioxide. The amount of ammonia present in solution is, therefore, directly proportional to the amount of urea present in the specimen fluid and this is reflected by the intensity of the color developed by the composition.

In order to promote enzyme activity, the urease is placed in a buffered solution having a pH favorable for enzyme activity, which pH is regulated by the use of an appropriate buffer system. Such buffers are well known in the chemical art and are usually a mixture of a weak acid with a salt which is derived from a weak acid. However, under some circumstances the salts alone may be used. In the practice of the procedures of this invention, an amino-carboxylic compound may be used as the buffer. Specifically, salts of polyamino polycarboxylic compounds, such as, disodium ethylene diamine tetraacetate are used. These compounds are also well known in the chemical art as chelating agents. It has been observed that the addition of disodium ethylene diamine tetraacetate to solutions of the invented composition results in solutions having great storage stability. It is thought that the chelating agent ties up trace amounts of heavy metal ions by forming so called coordination compounds. By being taken out of solution by chemical combination the trace heavy metal ions present in water are unable to act catalytically on the enzyme urease or on the nitroprusside reaction. As a result, aqueous solutions of sodium salicylate, nitroprusside and ammonia containing a chelating agent are stable for extended time periods without the formation of turbidity or precipitates that could interfere with colorimetric techniques.

It is within the scope of the invented procedure to supply all the reagents in the form of tablets. The sodium salicylate and sodium nitroprusside are combined in predetermined amounts to compose one tablet while dichloro-S-triazine trione will be supplied as another tablet. The enzyme urease is supplied in a lyophilized state to preserve its reactivity.

In its broadest aspect, this invention contemplates the analytical determination of nitrogen in the form of ammonia in any fluid. The procedure used for that aspect would be the same as that described for the determination of urea, however, the enzyme urease would not be required.

In its practical applications, the invented composition will be utilized in the following manner. First, a buffered urease solution is prepared and to an appropriate amount is added the urea containing biological fluid. After a predetermined incubation period the sodium salicylate-nitroprusside in solution is added. These reagents could, of course, be added separately if so desired. Next, the alkaline hypochlorite solution is added. It is to be noted that in contradistinction to prior art procedures, delay in measuring the optical density of the solution after the addition of the hypochlorite solution can be tolerated when the invented composition is utilized because of the previously described reduced rate of color formation. It is also observed that the use of sodium salicylate in the reaction results in the development by the solution of an optical density that falls within the most accurate range of colorimetric measuring instruments. By use of an accurate measuring instrument such as spectrophotometer or colorimeter the transmission of light or other suitable radiation through the solution can be measured. By the application of Beer's law the concentration of the color compound present can be determined. From the comparison of this concentration to a standard solution the original concentration or urea present is calculated.

The following example is given to illustrate the invention. It will be clear that it is exemplary only and is not to be considered limitative thereof.

EXAMPLE

| | Grams |
|---|---|
| Sodium salicylate | 8.5 |
| Sodium nitroprusside | 0.06 |
| Sodium dichloro-S-triazine trione | 0.25 |
| Urease | 0.1 |
| EDTA buffered | 1.0 |

PREPARATION OF REAGENTS

Buffered urease solution was prepared by dissolving 1.0 gram of disodium ethylenediamine tetra acetate (Eastman Organic Chemicals) and 100 milligrams urease (Sigma Chemical Company, Type II) in about 75 milliliters of ammonia-free distilled water. The pH of the mixture was then adjusted to 6.5 with a small amount of 2.5 N sodium hydroxide and the final volume was brought to 100 milliliters with ammonia-free distilled water.

The salicylate color reagent was prepared as follows. A mixture of 8.5 grams of sodium salicylate and 60 milligrams of sodium nitroprusside was dissolved in a total volume of 100 milliliters with ammonia-free distilled water. This solution is stable almost indefinitely when stored in a glass container at room temperature.

Alkaline dichloro-S-triazine trione solution was prepared by bringing 250 milligrams of sodium dichloro-S-triazine trione to a final volume of 100 milliliters with 0.3 N sodium hydroxide solution. This mixture is stable for more than a month when stored in a glass container at about 40° F.

TEST PROCEDURE (1) A 20 microliter aliquot of serum is incubated with 0.2 milliliters of buffered urease for 10 minutes at 37° C.
(2) The mixture is then treated with 2.0 milliliters of salicylate reagent followed by 2.0 milliliters of alkaline dichloro-S-triazine trione solution.
(3) After allowing color to develop for 10 minutes at 37° C., the mixtures are diluted to a total volume of 10.0 milliliters with ammonia-free distilled water.
(4) The absorbance of the test solution is measured at 660 millimicrons in a Coleman spectrophotometer or in a Klett-Summerson colorimeter using a red filter (#660) against a reagent blank.

The optical density of the test solution is converted into urea nitrogen concentrations by means of a standard curve prepared by applying the method to several appropriate concentrations or urea.

The procedure was applied to duplicate 20 microliter quantities of 20 randomly selected sera collected from hospital patients. The replicate determinations showed that a high degree of reproducibility is obtained with the procedure. The differences between the duplicate measurements ranged from 0 to 5.0 milligrams/100 milliliters of serum, and averaged only 0.85 milligrams/100 milliliters.

Urea nitrogen levels of 40 sera were determined by this method and by an automated diacetyl monoxime procedure. Comparable results were obtained by the two methods at both high and low urea nitrogen concentrations. Correlation coefficients close to unity were obtained between the two sets of data.

Sera collected from 100 apparently healthy males and females were assayed for urea nitrogen according to the new procedure. Values ranged from 5 to 19 milligrams/100 milliliters and averaged approximately 12 milligrams/100 milliliters. These data are consistent with normal limits quoted for other urea nitrogen methods.

A detailed description of the invented color composition and its analytical use has been given for illustrative purposes in the foregoing specification. It will be apparent to those skilled in the art that if desired, non-interfering adjuvants may be included in this composition for purpose of improvement without departing from the spirit and scope of the invention.

What is claimed is:

1. A color changing composition for the colorimetric determination of nitrogen in fluids comprising an enzyme which converts the nitrogen in said nitrogen containing fluid to ammonia, a salt of salicylic acid mixed with a salt of nitroprussic acid, and a chlorine substituted azide which yields hypochlorite in alkaline solution.

2. The color changing composition of claim 1, wherein said salt of said salicylic acid is selected from the group consisting of sodium salicylate, potassium salicylate, lithium salicylate and magnesium salicylate.

3. A color developing composition for the colorimetric determination of urea nitrogen in biological fluids comprising an enzyme which reacts with said urea to liberate ammonia, sodium salicylate mixed with a salt of nitroprussic acid, and a chlorine substituted triazine which yields hypochlorite in alkaline solution.

4. The color developing composition of claim 3 in which said enzyme is buffered urease.

5. The color developing composition of claim 3 in which said chlorine substituted azide is selected from the group consisting of sodium dichloro-S-triazine trione and potassium dichloro-S-triazine trione.

6. The color developing composition of claim 5 in which said salt of nitroprussic acid is selected from the group consisting of cupric nitroprusside cobalt nitroprusside, nickel nitroprusside, zinc nitroprusside, and sodium nitroprusside.

7. A color developing composition for the colorimetric determination of urea nitrogen in biological fluids comprising buffered urease, sodium dichloro-S-Triazine trione, and sodium salicylate mixed with sodium nitroprusside in which the ratio by weight of said sodium nitroprusside to said sodium salicylate is in the range 1:300 to 1:20.

8. The color developing composition of claim 7 in which the buffer of said buffered urease is comprised of an aqueous solution of disodium ethylene diamine tetra acetate.

9. A method for the analysis of urea nitrogen in biological fluids comprising the steps of sequentially bringing together in solution an amount of buffered enzyme sufficient thereby to convert the urea nitrogen in said biological fluid to ammonia nitrogen in solution, a predetermined amount of a salt of nitroprusside, and an amount of a chlorine substituted azide which yields hypochlorite in alkaline solution; and measuring the optical absorption of said solution photometrically.

10. The method of claim 9 in which the ratio by weight of the salt of nitroprusside to sodium salicylate is within the range 1:300 to 1:20.

11. The method of claim 10 in which said salt of nitroprusside is selected from the group consisting of cupric nitroprusside, cobalt nitroprusside, nickel nitroprusside, zinc nitroprusside and sodium nitroprusside.

12. The method of claim 11 in which the nitroprusside salt is sodium nitroprusside.

13. The method of claim 12 in which a chlorine substituted azide in alkaline solution is sodium dichloro-S-triazine trione in a solution of sodium hydroxide.

14. The method of claim 13 in which the amount of sodium nitroprusside mixed with sodium salicylate and the amount of dichloro-S-triazine trione are added to the solution in reverse order.

15. The method of claim 14 in which the amount of sodium nitroprusside mixed with sodium salicylate and the amount of dichloro-S-triazine trione are added to the solution concurrently.

16. A color changing composition for the colorimetric determination of nitrogen in the form of ammonia in fluids comprising a salt of salicylic acid mixed with a salt of nitroprussic acid, and a chlorine substituted azide which yields hypochlorite in alkaline solution.

17. The color changing composition of claim 16 wherein said salt of said salicylic acid is selected from the group consisting of sodium salicylate, potassium salicylate, lithium salicylate and magnesium salicylate.

18. A color changing composition for the colorimetric determination of nitrogen in fluids comprising an enzyme which converts the nitrogen in said nitrogen containing fluid to ammonia, sodium salicylate, and a chlorine substituted azide which yields hypochlorite in alkaline solution.

19. A color changing composition for the colorimetric determination of nitrogen in fluids comprising an enzyme which converts the nitrogen in said nitrogen containing fluid to ammonia, phenyl benzoate in aqueous alcohol solution, and a salt of nitroprussic acid.

20. The method of claim 9 wherein said buffered enzyme is urease.

References Cited

UNITED STATES PATENTS 3,119,751   1/1964   Chaney _____ 195—103.5

ALVIN E. TANENHOLTZ, *Primary Examiner.*

U.S. Cl. X.R.

23—232; 252—408